United States Patent [19]
Abromavage et al.

[11] 3,910,604
[45] Oct. 7, 1975

[54] WEIGHT EQUALIZING DEVICE FOR AUTOMOBILE BUMPER HITCHES

[75] Inventors: John C. Abromavage, Tempe; James W. Ryden, Phoenix, both of Ariz.

[73] Assignee: Amerco, Inc., Phoenix, Ariz.

[22] Filed: Sept. 11, 1974

[21] Appl. No.: 504,935

[52] U.S. Cl. .......................... 280/406 A; 280/446 B
[51] Int. Cl.² ........................................... B60D 1/16
[58] Field of Search ....... 280/406 A, 502, 501, 489, 280/400, 406 R, 446 B

[56] References Cited
UNITED STATES PATENTS

| | | | |
|---|---|---|---|
| 3,093,393 | 11/1963 | Madden | 280/406 A |
| 3,113,789 | 12/1963 | Safford | 280/502 |
| 3,445,125 | 5/1969 | Stewart | 280/406 A |
| 3,657,695 | 4/1972 | Birmingham | 28/400 UX |
| 3,700,053 | 10/1972 | Glissendorf | 280/400 UX |

*Primary Examiner*—Leo Friaglia
*Attorney, Agent, or Firm*—David H. Semmes

[57] ABSTRACT

Vehicle hitches of the type having a horizontal hitch bar supporting a medial coupling ball for pulling rental and other utility trailers. Particularly, a weight equalizing device independently pivoted with respect to the hitch bar and extending from the trailer tongue to the automobile frame so as to transfer load to the towing vehicle automobile frame. The device is characterized by a tension plate supported adjacent the the hitch bar and having a tension bar extending aft to the trailer tongue and a pair of coupling chains extending forwardly to engage the auto frame. The device may be used to adjust the trailer tongue level. In addition, the device also provides sway control.

13 Claims, 9 Drawing Figures

WEIGHT EQUALIZING DEVICE FOR AUTOMOBILE BUMPER HITCHES

BACKGROUND OF THE INVENTION

1. Field of the Invention

Automobile trailer hitches, particularly bumper hitches of the type releasably attached to the rear bumper of an automobile for pulling a rental or utility trailer. The hitch includes a horizontal hitch bar mounting a coupling ball, the bar extending laterally through a pair of bumper clasping elements.

2. Description of the Prior Art

Prior art weight equalizing devices require special installation both in the towing vehicle and in the towed trailer. For example, the towing vehicle requires a special cross-tree for supporting the coupling ball, as well as forwardly extending rigid arms which engage the automobile frame. The towed trailer includes one or more cross-trees specially mounted upon the trailer tongue and a supplemental locking mechanism which is complementally engageable with a locking stud adjacent the coupling ball. Installation of the device by welding to the frame and trailer costs $200.00 to $300.00 in parts and labor. Due to their mechanical complexity, such weight equalizing devices have not been adaptable for use with conventional bumper hitches. Also, such devices have not been utilizable with energy absorption type bumpers.

SUMMARY OF THE INVENTION:

According to the present invention, an automobile bumper hitch, which may be mounted upon an energy absorption bumper is provided with a weight equalizing system which is pivoted medially upon the hitch bar and includes a tension bar extending rearwardly to the towed trailer tongue and a pair of flexible tensioning chains extending forwardly to the automobile frame. The load is transferred forwardly and rearwardly from the coupling ball and hitch bar by tensioning adjustment of the tension bar at the point of its flexible connection with the towed vehicle trailer tongue and consequent, simultaneous tensioning of the forwardly extending chain elements with respect to the automobile frame.

The device while equalizing distribution of load between towed trailer and the towing vehicle, also, of course, levels the trailer with respect to the surface upon which it is towed. This leveling aspect enables the trailer user to level the trailer after the load has been placed in the trailer, thus ensuring additional safety in the tow.

DESCRIPTION OF THE PREFERRED EMBODIMENTS

Figure 1:
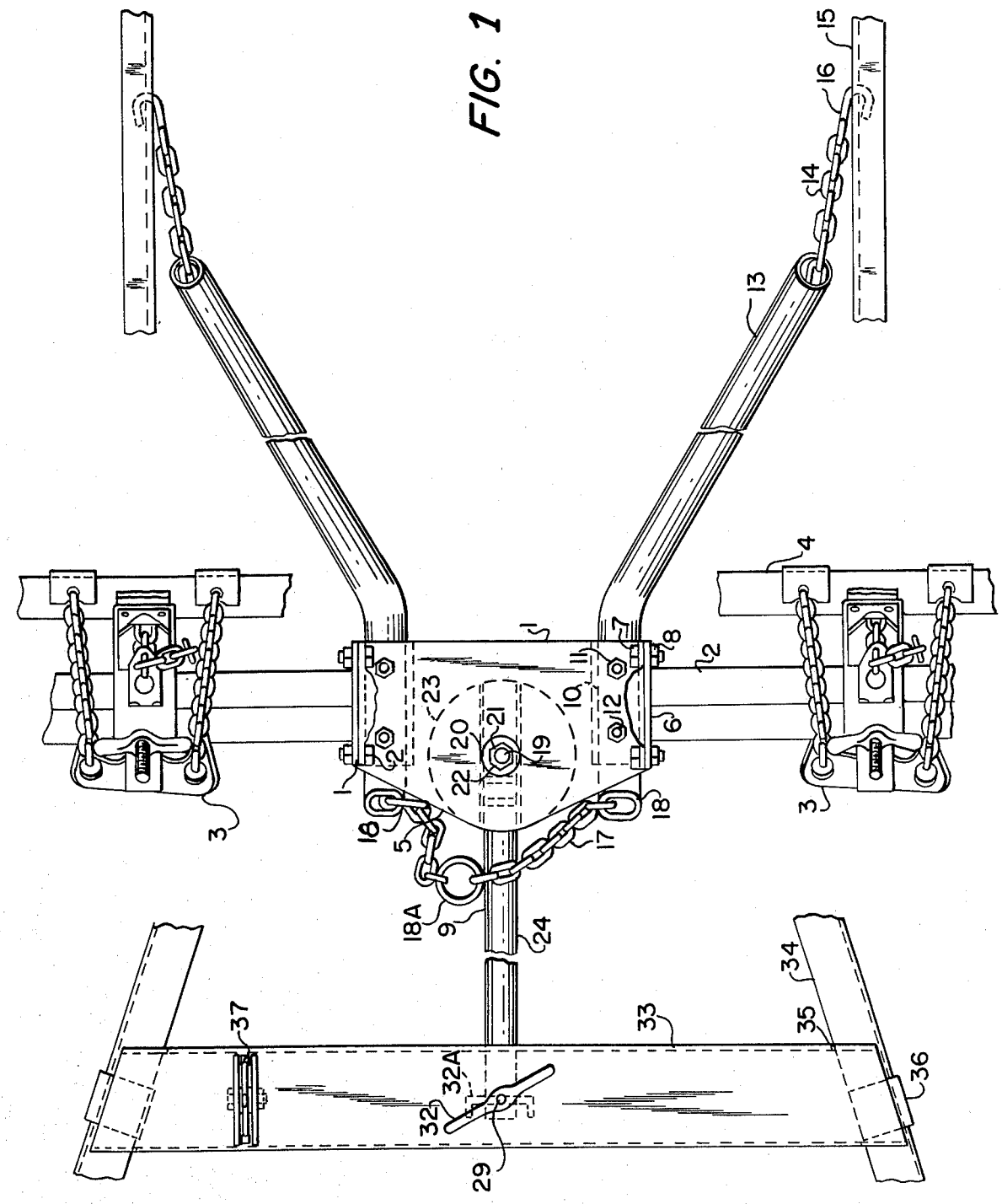
FIG. 1 is a fragmentary top plan view of the automobile bumper hitch bar supporting the weight equalizing tensioning platform with its pair of chain elements extending forwardly to the automobile frame and its tension bar extending aft to a cross-tree mounted upon the trailer tongue.

FIG. 1 is a top view showing the weight equalizing device 1 mounted on bumper hitch bar 2. Hitch bar 2 is held in place by two tension hitch jaws 3 which attach to the towing vehicle bumper 4.

The weight equalizing device 1 attaches to hitch bar 2 by means of a platform bracket 5, top plates 6, thru bolts 7 and nuts 8. Platform bracket 5 and top plates 6 provide a convenient way of attaching the equalizer to a standard bumper hitch without disassembling the entire hitch. The forces applied by the spring bar assembly 9, and reaction arm assemblies 10, counter balance each other, thus eliminating the torsional loading on the bumper hitch and bumper. As shown most clearly in FIGS. 1 and 2 the spring bar 24 has its proximate end horizontally pivotable at 19 and its distal end adjustably tensionable relative to said trailer tongue by adjustable lug 29 and chain 27.

Figure 6:
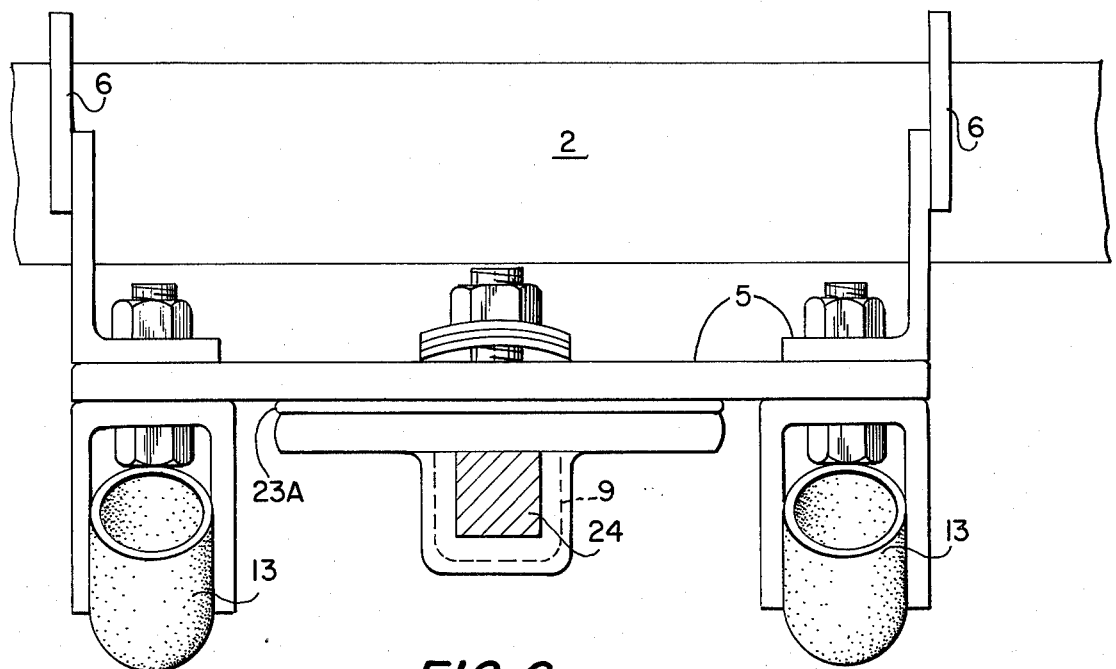
FIG. 6 is an end elevation of the tension plate and housing.
Figure 8:
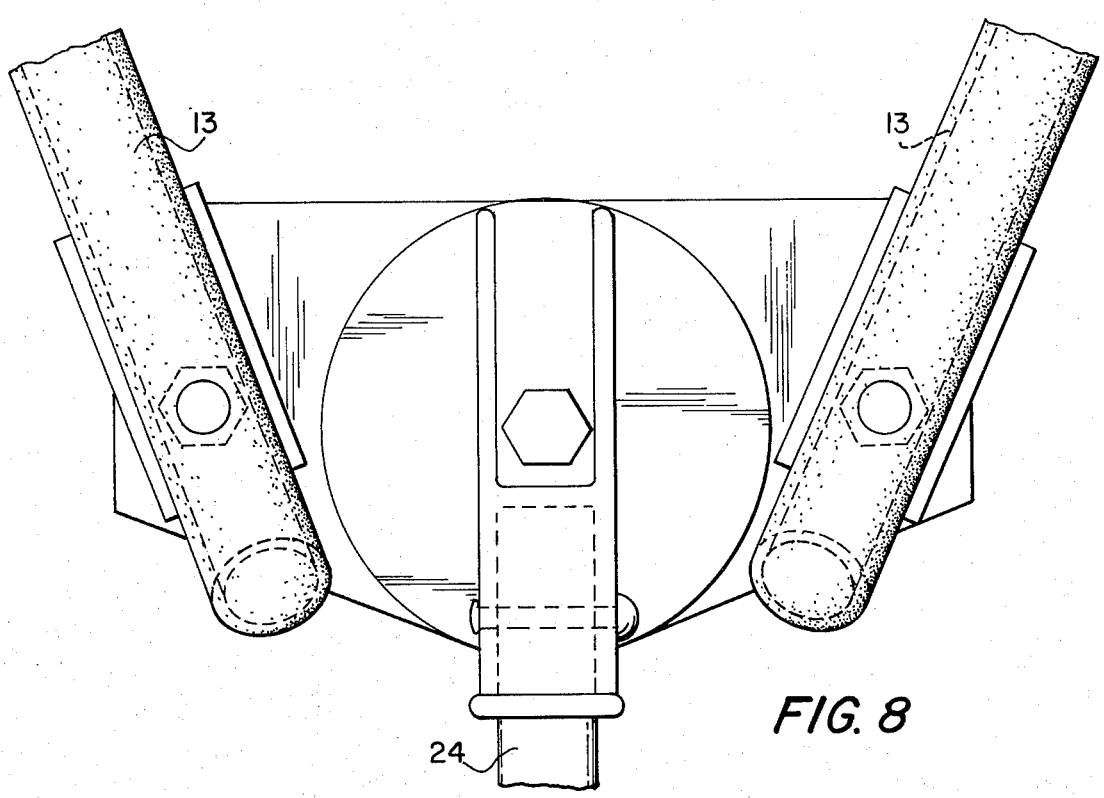
FIG. 8 is a bottom plan of a modification of the invention wherein the chain covers are pivoted with respect to the pivot plate.
Figure 7:
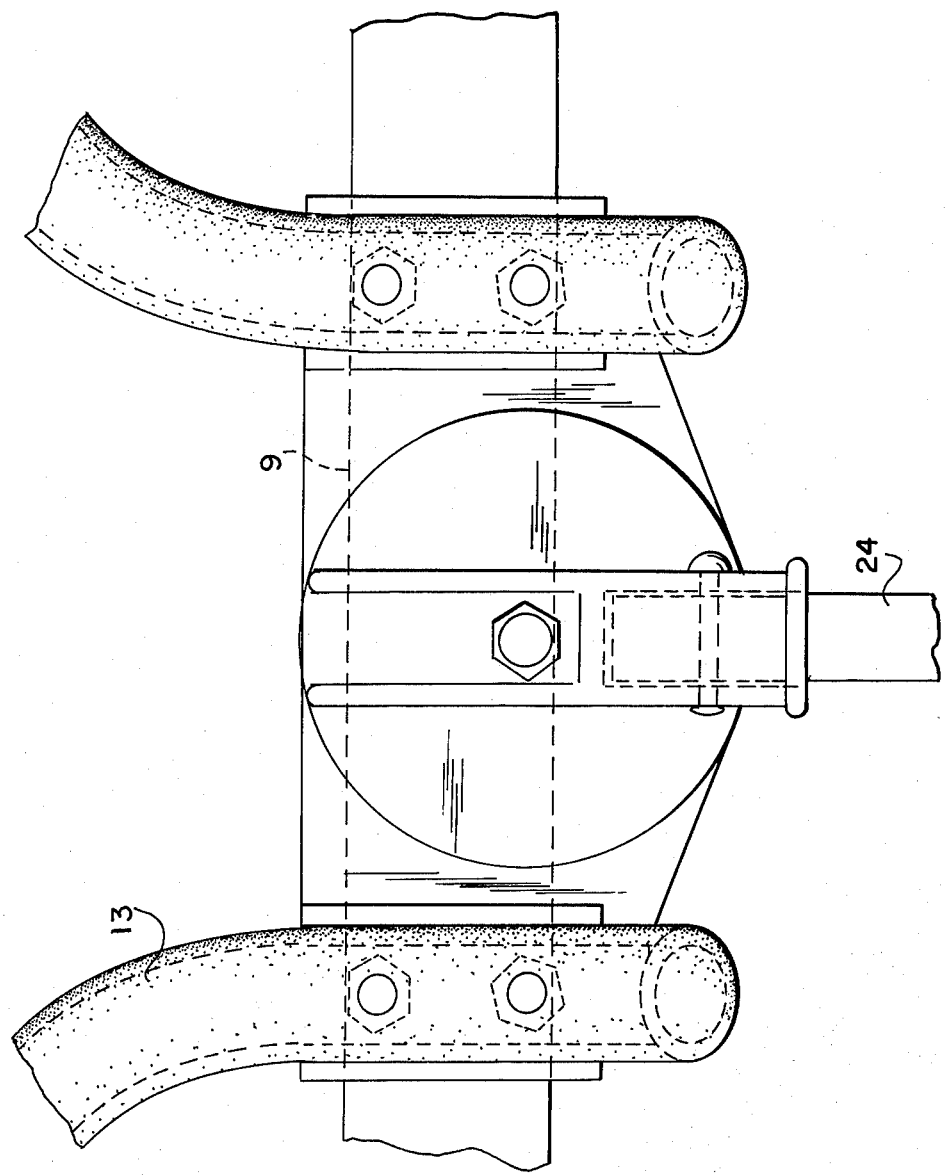
FIG. 7 is a bottom plan of the pivot plate, showing installation of the tension bar forward end and tension bar retainer.

Extending forward from the platform bracket 5 are reaction arm assemblies 10, each mounted upon platform bracket 5 by means of nuts 11 and bolts 12. Frame chains 14 extend through the hollow tubular frame reaction arms 13. Frame chains 14 at their forward end are hooked to the tow vehicle frame members 15 by means of grab hooks 16. Frame chains 14 at their aft end are tensioned on the frame by insertion of chain links 17 into slots 18 at the aft end of frame reaction arms 13. The chains 14 are retained to each other by a hog ring 18A. As illustrated in FIGS. 6–8 and hereinafter explained, these reaction arms each have a proximate end mounted upon the platform bracket, and a distal end from which a flexible connector 14 is removably connectable to the frame 15 of a vehicle. The flexible connector is illustrated as a chain 14 which has a hooked at 16 and locked at slots 18 to place each reaction arm in tension relative to the frame 15.

Figure 2:
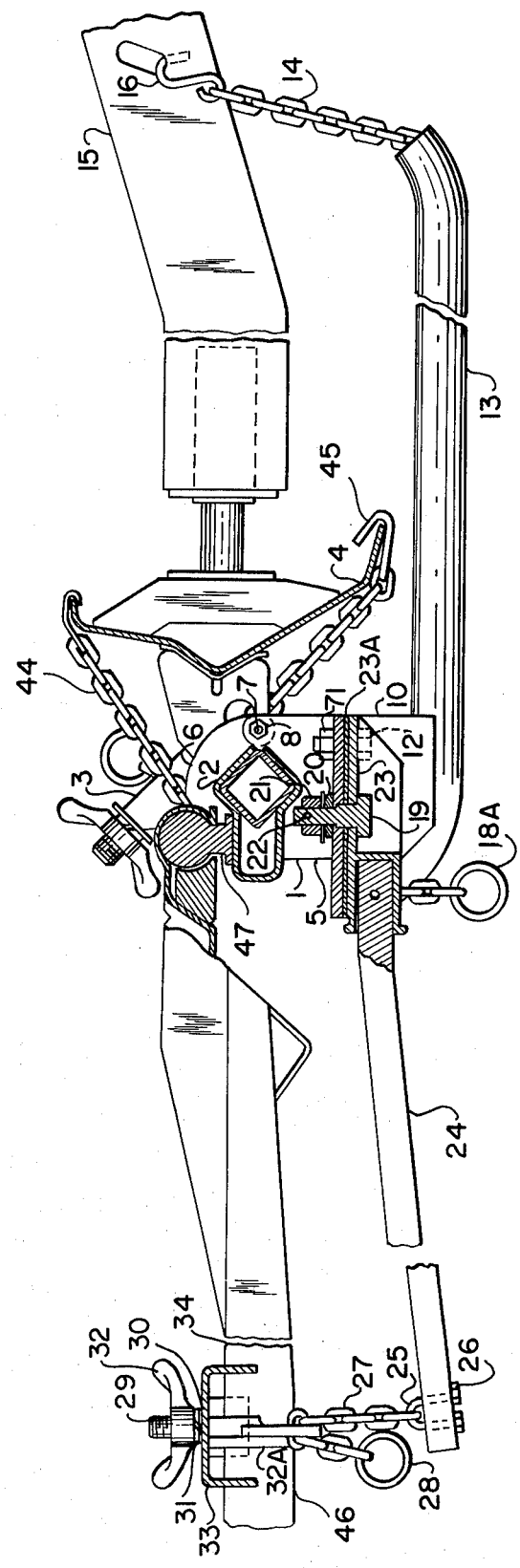
FIG. 2 is a fragmentary, side elevation, partially in section showing the mounting of the hitch bar upon an energy absorbing bumper with the weight equalizing chain elements extending to the auto frame and the tension bar extending longitudinally with respect to the trailer in tow.

Spring bar assembly 9 is attached to the platform bracket 5 by means of a vertically extending shoulder bolt 19, Belleville washers 20, castellated nut 21, and cotter pin 22. The attaching means maintain a constant pressure between the bottom of the platform bracket 5 and the top of the spring bar holder 23. A friction plate of asbestos or the like 23A, FIG. 2 provides sway control. The spring bar assembly 9 is allowed to pivot about a vertical axis substantially coincident with the hitch ball vertical axis.

As illustrated in FIG. 2, spring bar assembly 9 consists of the spring bar holder 23, spring bar 24, aft end U-bolt 25, nuts 26, spring bar chain 27 and hog ring 28. Spring bar chain 27 is inserted through lug adjuster 29. Lug adjuster 29 is held by flat washer 30, lock washer 31 and wig nut 32. Tightening of wing nut 32 produces a force on spring bar 24 which serves to distribute the trailer tongue weight both to the towing vehicle front axle and the trailer axle(s) and to remove weight from the towing vehicle rear axle. The lug adjuster 29 is prevented from rotation by the lug retainer 32A.

As illustrated in FIG. 1 spring bar 24 force is resisted by cross bar 33 which rests on the trailer tongue 34. Cross bar 33 is prevented from moving forward by notches 35 and from moving rearward by positioning straps 36.

Figure 4:
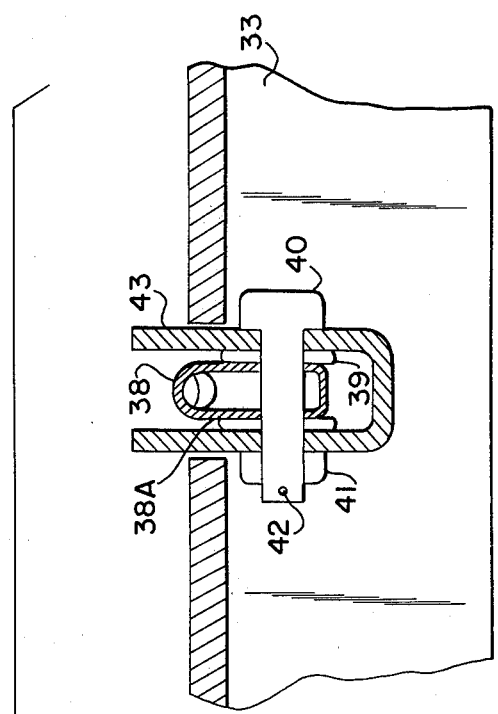
FIG. 4 is a section view taken along section line 4—4 of FIG. 3 and showing another view of the bubble and its mounting module.
Figure 3:
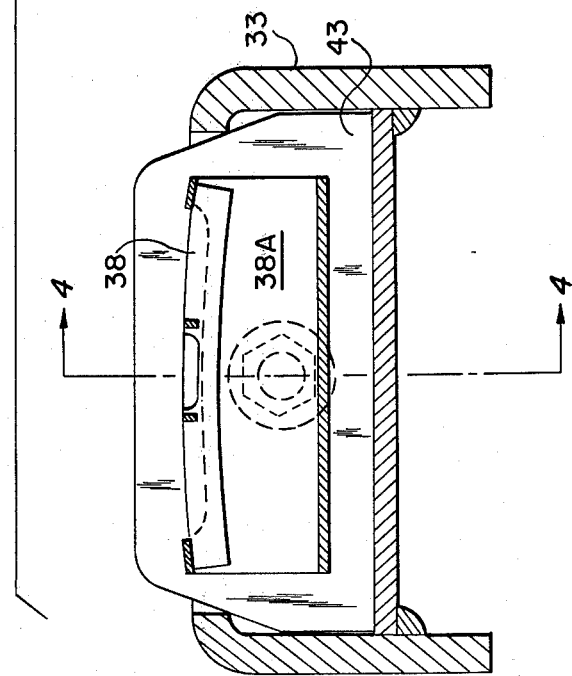
FIG. 3 is a transverse section of the trailer cross bar, showing the level indicating bubble device.
Figure 5:
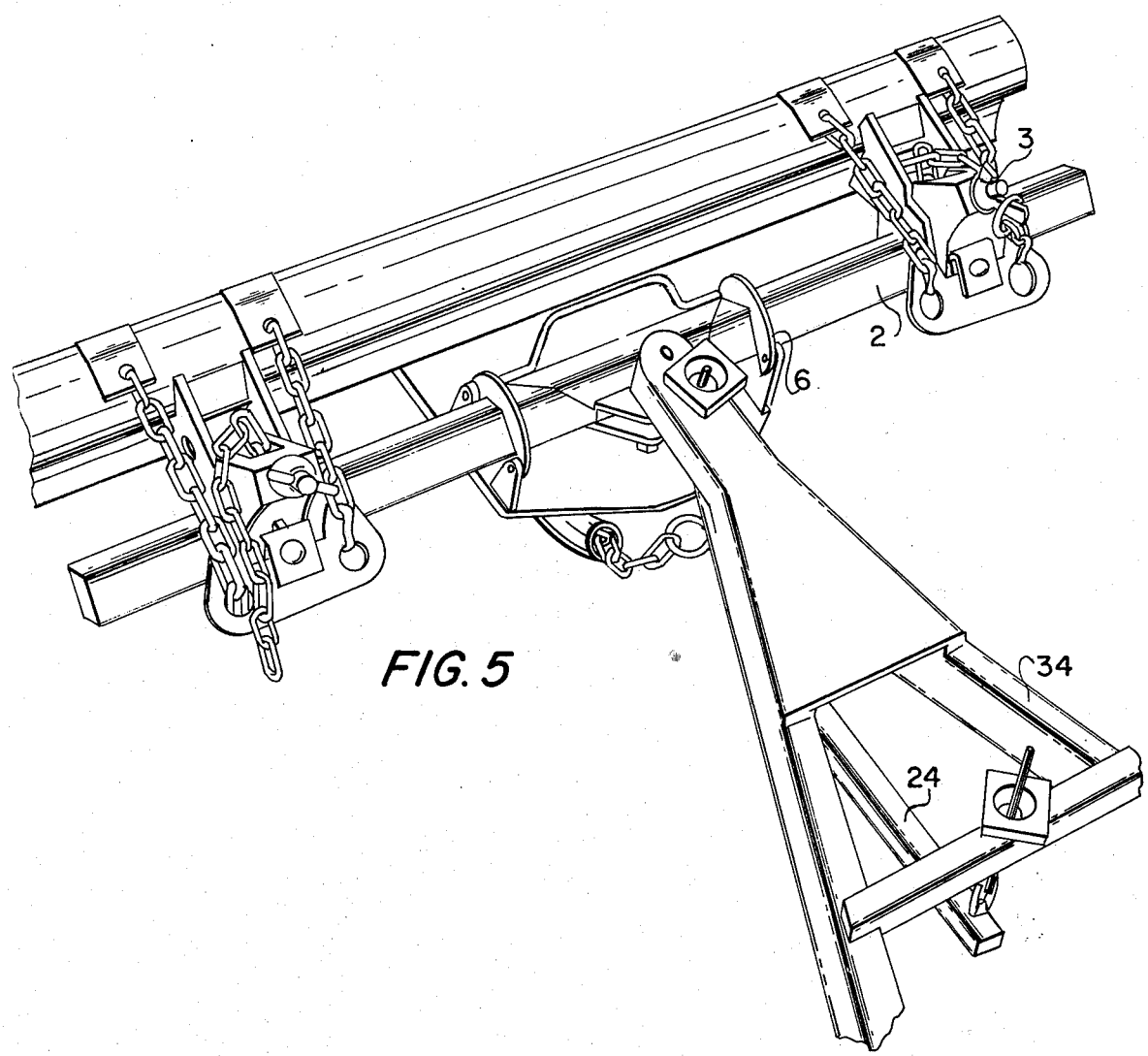
FIG. 5 is a fragmentary perspective, showing mounting of the weight equalizing device with respect to the automobile frame and the towed trailer tongue.
Figure 9:
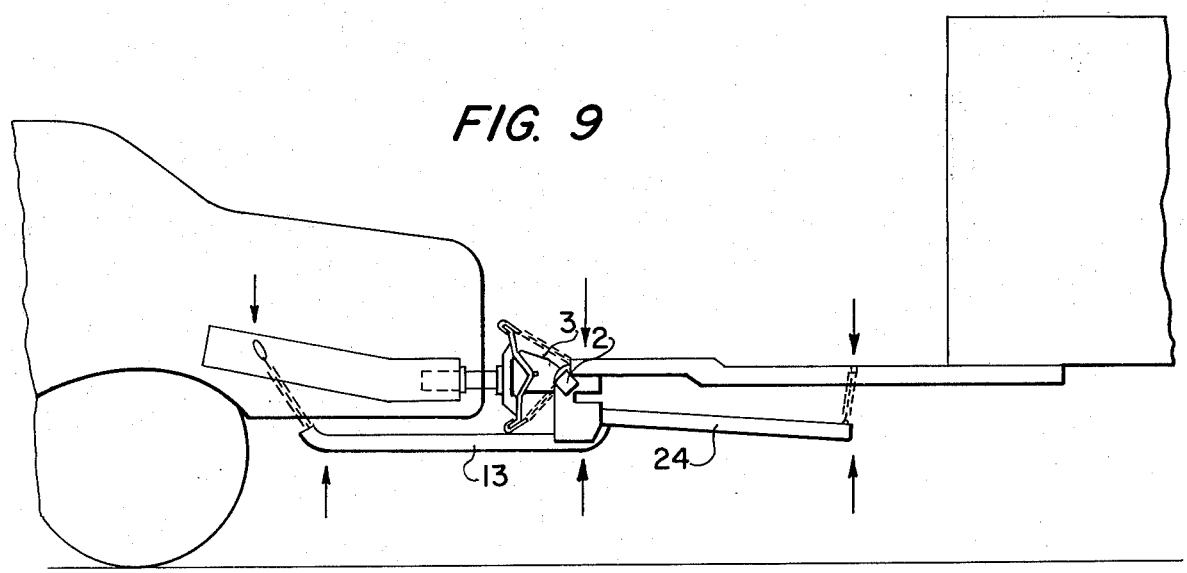
FIG. 9 is a fragmentary side elevation, showing a hitch leveled with respect to the towing surface.

The trailer attitude is determined from the bubble gauge 37 as in FIG. 1 and the bubble tube 38 as in FIGS. 3 and 4. A bubble tube 38 is held between washers 39 by bolt 40, castellated nut 41, and cotter pin 42. The compression of the washers allowed by gauge bracket 43 holds the bubble tube in whatever angle it may be set. The bubble gauge 38 is moved to center the bubble with the trailer empty. After the trailer is loaded spring bar 24 tension is adjusted by means of wing nut 32 to return the bubble to, or near, its original (empty trailer) position. The initial setting or calibrating of the bubble gauge 38 as aforesaid is required to compensate for variations in coupler and hitch ball heights.

As will be apparent, the present weight equalizing device is readily installed upon a rental trailer, such that static forces imposed by the trailer load are transferred in large part to the towing vehicle frame. The magnitude of transferred forces may be adjusted simply by increasing or diminishing the the load on the spring bar 24 by means of the lug adjuster 29 and wing nut 32. Thus, the weight equalizing forces may be adjusted to compensate for the particular load placed within the trailer being pulled. As a result, a constant level attitude is maintained, regardless of the trailer tongue's actual weight. In addition to its universal adaptability to bumper hitches, the device is compatible with energy absorbing bumper systems, as well as surge braking systems. It serves also as an anti-sway control in addition to its weight equalizing device.

METHOD OF INSTALLATION

A. Install the bumper hitch by placing the bumper abutting elements 3 in position and adjust top chains 44. Do not tighten bottom hooks 45 until step B has been completed.
B. Attach the forward tension chain hooks 16 to the automobile frame 15 and pull all the slack out of the chain. Then hook chain link in slot 18 at the rear end of the reaction arms 13.
C. Hook up trailer to hitch ball 47 and tighten coupler.
D. Unscrew wing nut 32 and place crossbar 33 in position. Orient bubble leveling device (38) in FIG. 3.
E. Load the trailer;
F. Hook up chain 27 and rear end of tension bar 24 and tighten wing nut 32 until the trailer tongue 46 and bubble leveling device 37 indicates a level position.

Manifestly, the device may be used with a permanent type hitch, as well as bumper hitches.

We claim:
1. A weight equalizing device for hitches attached to vehicles, said hitches including a rigid mounting structure including a coupling for attachment to a mating coupling on the tongue of the trailer to be towed, said device comprising:
A. a bracket means rigidly attached to said rigid mounting structure and further comprising a platform bracket, and;
B. at least one spring bar, said bar having a proximate end which includes means mounted and horizontally pivotable upon said platform bracket, said bar having a distal end which includes first means for adjustably tensioning said spring bar relative to said trailer tongue, and;
C. a reaction arm assembly including at least one reaction arm, said arm having a proximate end mounted upon said platform bracket, and a distal end which includes a second tensioning means comprising a flexible connector removably connectable to the frame of said vehicle and operable to place said reaction arm assembly in tension relative to said vehicle frame.

2. In a bumper hitch of the type having a horizontal hitch bar rigidly supporting a coupling ball, said ball adapted for a mating coupling to the tongue of a trailer, wherein said horizontal bar further includes bumper clasping elements for removable connection of said hitch to said bumper of a vehicle wherein the improvement comprises a weight equalizing device comprising in combination:
A. a bracket means rigidly attached to said horizontal hitch bar and including a platform bracket, and;
B. at least one spring bar, said bar having a proximate end which includes means mounted and horizontally pivotable upon said platform bracket, said bar having a distal end which includes first means operable to be adjustably tensioned between said spring bar and a trailer tongue, and;
C. a reaction arm assembly including at least one reaction arm, said arm having a proximate end mounted upon said platform bracket, and a distal end which includes second means comprising a flexible connector operable for removable connection to a portion of the frame of a vehicle and further including means operable to tension said flexible connector between said distal end and said vehicle frame.

3. A weight equalizing device for automobile bumper hitches as in claim 2, wherein the bumper is of the energy absorption type.

4. A weight equalizing device for automobile bumper hitches as in claim 2, including an adjustable level indicating means affixed to an equalizer cross tree position upon said trailer tongue.

5. An improved bumper hitch according to claim 2 wherein said reaction arm assembly comprises a pair of reaction arms, wherein each arm is a hollow tube and includes locking means at its proximate end wherein said flexible connector is a chain extending through said arm and securable at said locking means to comprise said second tensioning means.

6. An improved bumper hitch according to claim 4 wherein said equalizer cross tree comprises a vertically adjustable means engageable with a chain as said first means for operably tensioning said spring bar.

7. A weight equalizing device according to claim 1 wherein said means for mounting and horizontally pivoting said spring bar proximate end comprises a plate pivotably engaging a lower horizontal surface of said platform bracket.

8. A weight equalizing device as in claim 7, said lower plate including an anti-friction element interposed between said plate and said horizontal surface.

9. A weight equalizing device according to claim 1 wherein said first means for adjustably tensioning said spring bar further comprises a chain engageable with a vertically adjustable means supported upon said trailer tongue.

10. An improved weight equalizing device according to claim 1 wherein said reaction arm assembly comprises a pair of reaction arms, wherein each arm is a hollow tube and includes locking means at its proximate end wherein said flexible connector is a chain extending through said arm and securable at said locking means to comprise said second tensioning means.

11. An improved bumper hitch according to claim 1 including an adjustable level indicating means affixed to an equalizer cross tree position upon said trailer tongue.

12. An improved bumper hitch according to claim 2 wherein said means for mounting and horizontally pivoting said spring bar proximate end comprises a plate engaging a lower horizontal surface of said platform bracket.

13. An improved bumper hitch according to claim 12 wherein said lower plate includes an anti-friction element interposed between said plate and said horizontal surface.

* * * * *